United States Patent
Lounegov (10) Patent No.: US 11,425,112 B1
(45) Date of Patent: Aug. 23, 2022

(54) SYSTEMS AND METHODS FOR BLOCKCHAIN VALIDATION AND DATA RECORD ACCESS EMPLOYING A BLOCKCHAIN CONFIGURED BANKING CORE AND BLOCKCHAIN CONFIGURED FEDERATION PROXIES

(71) Applicant: FinLink, Inc., Healdsburg, CA (US)

(72) Inventor: Vladimir Lounegov, Walnut Creek, CA (US)

(73) Assignee: FINLINK, INC., Healdsburg, CA (US)

( * ) Notice: Subject to any disclaimer, the term of this patent is extended or adjusted under 35 U.S.C. 154(b) by 17 days.

(21) Appl. No.: 17/165,267

(22) Filed: Feb. 2, 2021

(51) Int. Cl.
  G06F 7/04 (2006.01)
  G06F 15/16 (2006.01)
  G06F 17/30 (2006.01)
  H04L 29/06 (2006.01)
  H04L 9/40 (2022.01)
  G06Q 40/02 (2012.01)

(52) U.S. Cl.
  CPC ......... *H04L 63/0815* (2013.01); *G06Q 40/02* (2013.01); *H04L 63/0281* (2013.01); *H04L 63/105* (2013.01); *H04L 63/108* (2013.01)

(58) Field of Classification Search
  CPC ............. H04L 63/0815; H04L 63/0281; H04L 63/105; H04L 63/108; G06Q 40/02
  See application file for complete search history.

(56) References Cited

U.S. PATENT DOCUMENTS 11,170,437 B2 * 11/2021 Yang .................. G06Q 20/102
2015/0170112 A1  6/2015 DeCastro
2017/0048216 A1  2/2017 Chow et al.
2019/0087892 A1 * 3/2019 Pinski .................. H04L 9/0637
2019/0197532 A1  6/2019 Jayachandran et al.
2019/0385223 A1 * 12/2019 Sharma ............... H04L 63/0823
(Continued)

FOREIGN PATENT DOCUMENTS

WO    2017145004 A1   8/2017
WO    2019199288 A1   10/2019

OTHER PUBLICATIONS

George Drosatos, et al., "Blockchain Applications in the Biomedical Domain: A Scoping Review", Computational and Structural Biotechnology Journal, vol. 17, pp. 229-240 (2019).
(Continued)

*Primary Examiner* — Amie C. Lin
(74) *Attorney, Agent, or Firm* — Gary J. Gershik (57) ABSTRACT

Blockchain validation systems including a blockchain configured banking core (BCBC) hosted on a server, a blockchain configured component coupled to the BCBC, permitting transfer of data records to the BCBC for storage thereon, and a number of blockchain configured federation proxies facilitating identification of access rules and execution of blockchain validation mechanisms. Methods for blockchain validation involving permitting interaction amongst a plurality of external computing systems associated with a plurality of entities in a manner bypassing a BCBC hosted on a server, through a blockchain configured component accessible by the external computing systems, permitting data record transfer to the BCBC over an independent verification network, managing the data records using blockchain configured federation proxies, and selectively distributing data records to the entities.

23 Claims, 3 Drawing Sheets

(56) References Cited

U.S. PATENT DOCUMENTS

2020/0051071 A1\* 2/2020 Wu .................. G06Q 20/3678
2020/0068013 A1 2/2020 Zakharov et al.

OTHER PUBLICATIONS

Venkatesha N. Vysya, et al., "Blockchain Adoption in Financial Services", Infosys Limited (2019).
Toshendra Kumar Sharma, "Document Verification System Using Blockchain", Blockchain Council (2017).
"Blockchain in Logistics", DHL Trend Research (2016).
"What is Blockchain and Why Should Records Management Professionals Care?", Iron Mountain Incorporated (2020).
Allen Chan, et al., "Use Blockchain to Manage Legal Documents Stored in an Enterprise Content Repository", IBM Developer (2017).

\* cited by examiner

SYSTEMS AND METHODS FOR BLOCKCHAIN VALIDATION AND DATA RECORD ACCESS EMPLOYING A BLOCKCHAIN CONFIGURED BANKING CORE AND BLOCKCHAIN CONFIGURED FEDERATION PROXIES

FIELD OF THE INVENTION

The present invention relates to systems, methods and apparatuses for making more transparent, to outside persons or organizations, a core banking functionality. Specifically, embodiments, include systems, methods and apparatuses to track fulfillment of actions related to financial transaction processing.

BACKGROUND OF THE INVENTION

As discussed for example in U.S. Publication No. 2017/0048216 of Chow et al., U.S. Publication No. 2020/0068013 of Zakharov et al., International Publication No. WO 2017/0145004 A1 of Wright et al., and International Publication No. 2019/199288 A1 of Andrade, blockchain technology has been used for a variety of applications, including managing of legal documents and other records management functions and financial services functions. As discussed for example in U.S. Publication No. 2015/0170112 A1 of DeCastro, hybrid blockchain structures have been employed. As discussed for example in U.S. Publication No. 2019/0197532 A1 of Jayachandran, access control rules exist that are updatable by an owner. Traditionally, core banking relies on relational database management systems.

However, there is a need for more convenient, efficient, redundant, transparent, secure, verifiable and error checkable ways of distributing tasks, in particular financial tasks, between internal and external blockchain and/or other infrastructure in order to perform blockchain validation and control access and management of data records.

SUMMARY OF THE INVENTION

This disclosure provides tools (in the form of apparatuses, methodologies and systems) allowing for convenient, efficient, redundant, transparent and secure use of a blockchain configured banking core (BCBC) and blockchain configured federation proxies, to perform functions such as data record access control and management and blockchain validation.

These tools allow for much-improved data storage reliability, for example, by using a distributed transaction registry. By using independently verifiable record data the risk of fraudulent activity and unauthorized access is significantly lowered, compared to traditional data storage and processing methods.

Additionally, the tools provided herein allow for ease of implementation of blockchain functionalities that can significantly expand institutions', such as financial institutions', service offerings. For example, these institutions can easily implement complex transaction flow based on smart contracts with digitized document storage evidencing these transactions.

Moreover, these tools may simplify, or even eliminate, the traditionally complex and costly settlement process. Accordingly, these tools may enable implementation of a banking core system that serves as a single source of truth in the financial industry.

BRIEF DESCRIPTION OF THE DRAWINGS

Further features and advantages of the invention may be understood by reviewing the following detailed description of the preferred embodiments of the invention taken together with the attached drawings, in which.

DETAILED DESCRIPTION OF THE DRAWINGS AND PREFERRED EMBODIMENTS

Figure 1:
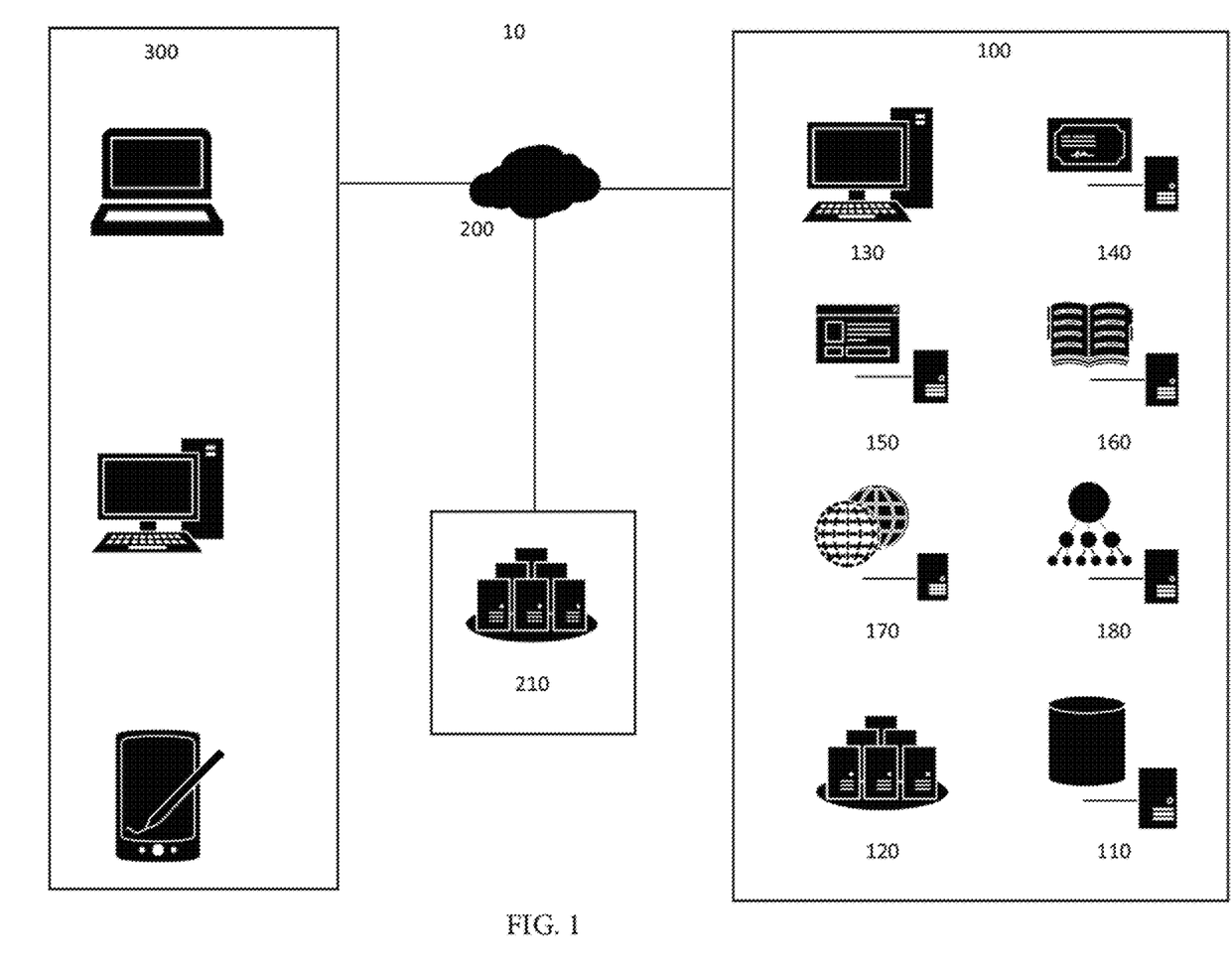
FIG. 1 is a block diagram illustrating an example embodiment of a blockchain validation system 10 for processing transactions, such as financial transactions, which may serve as an exemplary embodiment of the present invention and which exemplary method embodiments of the present invention may be performed.

FIG. 1 is a block diagram illustrating an example embodiment of a blockchain validation system 10 for processing transactions.

This blockchain validation system 10's architecture may include a core banking infrastructure 100, a plurality of external devices 300 which may be associated with a plurality of entities (each of which may serve as a source of or accessor to data records), a communications network 200, which may be an active communications network, and an external and/or independently managed blockchain infrastructure 210.

The core banking infrastructure 100 may include one or more or all of a core banking system 110, which may for example be a traditional core banking system, and which may be linked to or in direct or indirect communication with an in-house or internal blockchain infrastructure or network 120. The core banking infrastructure may further include an operator workstation or workstations 130, certificate server or infrastructure 140, application server or infrastructure 150, directory 160, proxy or firewall 170, and management application or infrastructure 180. The core banking infrastructure 100 may employ these components to provide transaction data flow, access control and verification, for example as would normally be performed by a financial institution's infrastructure.

The in-house or internal blockchain infrastructure or network 120 may be in communication, such as over network 200, with external and/or independently managed blockchain infrastructure 210 to perform data record (including financial record) verification and provide access to portions of the records based on access rules. For example, the portions of the records may be record blocks, and the access rules may be implemented according to smart contracts such as blockchain smart contracts. The access rules and/or accompanying mechanisms may be based on rules and preferences of the plurality of entities upon authorization by the BCBC 100. The access to the record portions may be provided to external entities that are associated with the plurality of devices 300, for example over network 200. This access to records may be provided in a manner that bypasses the core banking infrastructure/BCBC 100.

Figure 2:
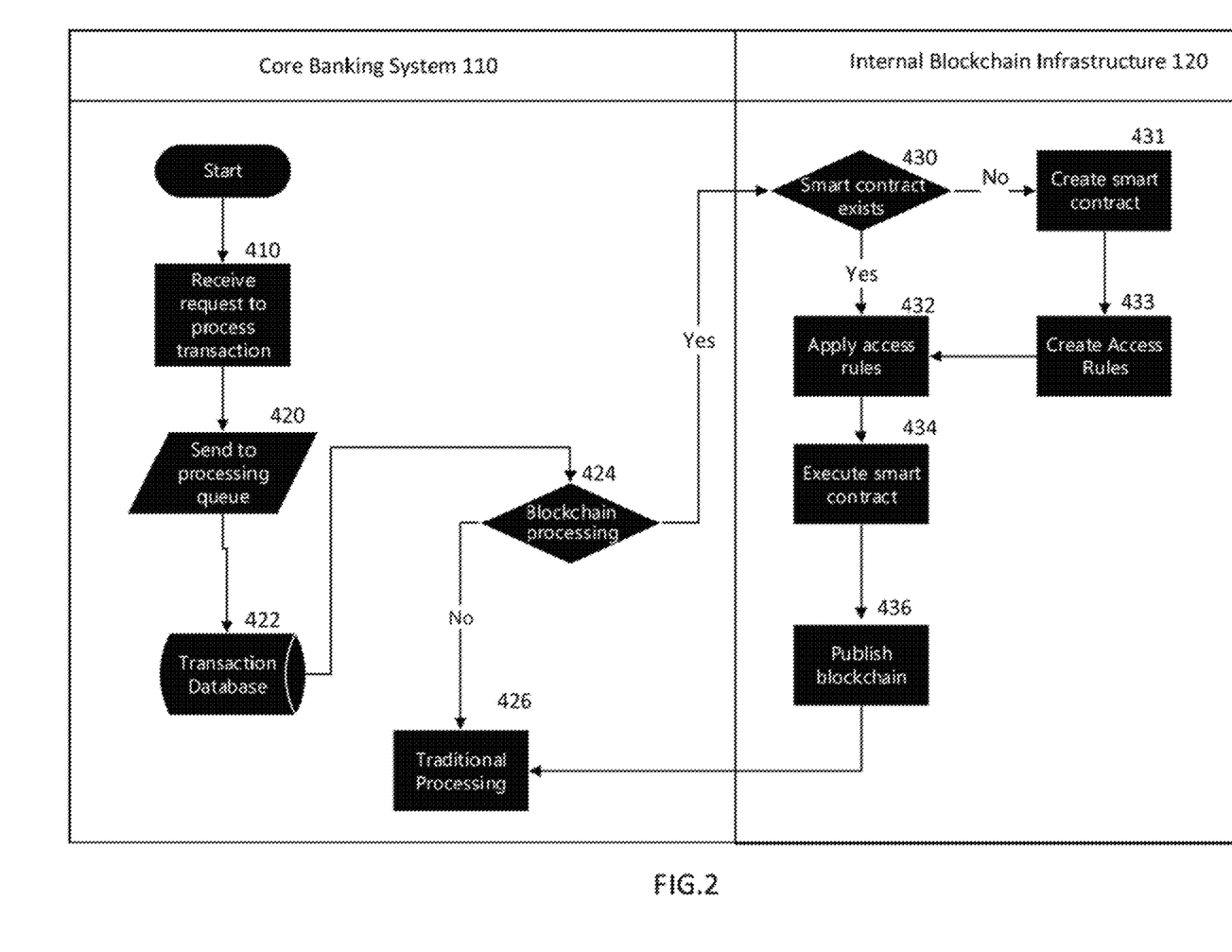
FIG. 2 is a flow, decision and system chart illustrating a transaction flow for processing financial transactions, and corresponding smart contracts, using a core banking system 110 and blockchain (e.g. internal) infrastructure 120, according to an exemplary embodiment of the present invention.

FIG. 2 is a flow, decision and system chart illustrating a transaction flow for processing financial transactions, and corresponding smart contracts, which may in certain embodiments be blockchain smart contracts, using a core banking system 110 and blockchain (e.g. internal) infrastructure 120.

According to one embodiment of the present invention, the transaction flow may start, at step 410, by a request being received, at the core banking system 110, to process a transaction. The request may be, for example, a request to initiate or receive a payment to fund an account, or such other financial or other transactions as may be known. At step 420, the request may be sent to a processing queue, or other data structure within or associated with the core banking system 110, for processing, and then it may be stored, at step 422, in a transaction database, for example, an incoming request log. The request may be stored in the transaction database for example in the form of transaction data.

Requests may be in a format associated with a software component associated with the requesting entity and may be converted, by a processor, to a blockchain record format. Information, such as financial information, may be stored in a blockchain record format and converted, such as by a processor, to a commonly agreed-upon format (which may then be distributed to appropriately authorized entities).

The core banking system 110 may determine, at step 424, whether access, updating, or management, for example by devices 300 associated with external entities, of a smart contract such as a blockchain smart contract is required. This determination may be based on an indication by an entity of its requirements for processing information (such as financial information). For example, such entity may have particular requirements for storing financial information maintained and/or stored by a financial system such as BCBC 100.

If such access, updating or management is not required, then the transactional flow may proceed to processing of the transaction internal to core banking system 110, for example in a manner traditionally associated with processing performed by a bank or other financial institution.

If, conversely, the core banking system 110 determines, at step 424, that such access, updating or management is required, then the transaction flow may proceed to step 430, which is performed by blockchain infrastructure, for example internal blockchain infrastructure 120. At step 430, the blockchain infrastructure makes a determination as to whether a corresponding smart contract already exists, for example within BCBC 100. If there is no corresponding smart contract, at step 431, the blockchain infrastructure may create a new smart contract for the transaction. To do so, the BCBC 100 may, for example, collect information uniquely identifying the parties to the transaction and configure a smart contract execution algorithm. The blockchain infrastructure may then, at step 433, create access rules applicable to the resulting smart contract.

At step 432, the access rules of the new or existing smart contract may be applied. At step 434, the BCBC 100 may execute the smart contract. The BCBC 100 may then, at step 436, publish the corresponding blockchain and/or its data corresponding to the transaction. This publishing may make the foregoing available to external and/or independent blockchain infrastructure 210.

Figure 3:
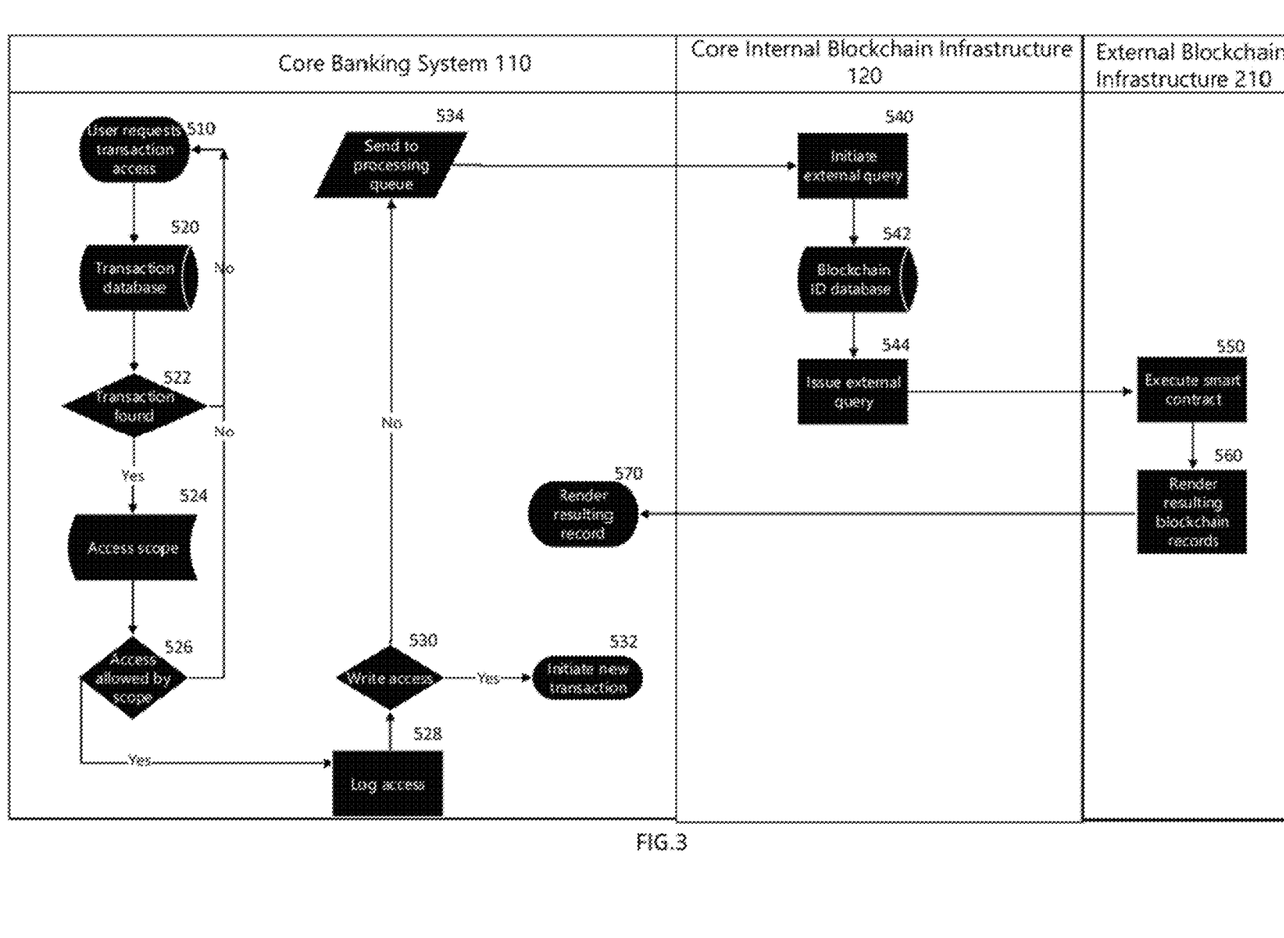
FIG. 3 is a flow, decision and system chart for accessing data records, such as financial records, previously processed by smart contract, using core banking system 110, core internal blockchain infrastructure 120, and external blockchain infrastructure 210, according to an exemplary embodiment of the present invention.

FIG. 3 is a flow, decision and system chart for accessing data records, such as financial records, previously processed by smart contract, such as a blockchain smart contract, using core banking system 110, core internal blockchain infrastructure 120, and external blockchain infrastructure 210.

The method may start at step 510, with the receipt, at the core banking system 110 of the BCBC 100, of a request to access a data record, for example data pertaining to a particular financial transaction.

Then, at step 520, the core banking system 110 searches a transaction database for the requested record. At step 522, a determination is made as to whether the record is found. If it is not found, the user may proceed to search for a different record. If the record is found, at step 524 the access scope records of the BCBC 100 may be reviewed. If it is determined, at step 526, that access by the user is permitted, for example because the user is logged as having adequate access rights with respect to the whole of, or to a part of, or in limited respects such as a time limitation to, the relevant data record. If access is allowed, then the access may, at step 528, be logged in a database associated with the core banking system 110 or the BCBC 100. In an alternate embodiment, unsuccessful access attempts may also be logged.

At step 530, a determination may be made as to whether the access attempt by the user is to require an updating of records. If so, at step 532, a new transaction may be initiated in order to update the records. If not, the method may proceed to step 534.

At step 534 the core banking system includes the access request in a processing queue or other data structure, for transmission to the internal blockchain infrastructure 120 of the BCBC 100. At step 540, the internal blockchain infrastructure may initiate an external query in order to obtain access to the requested records.

Then, at step 542, a database associated with the internal blockchain infrastructure 120 of the BCBC 100 is searched, for example for a blockchain identification or identification set corresponding to the entities stored in the data record, e.g. the participants to the associated financial transaction. This identify information is used, at step 544, in an external query that is issued by the internal blockchain infrastructure 120 of the BCBC 100 to the external blockchain infrastructure 210.

At step 550, the external blockchain infrastructure 210 may execute a smart contract corresponding to the data records, which may be independently verified data (e.g. blockchain) records stored in the external blockchain infrastructure 210. At step 560, the associated records may be rendered by the external blockchain infrastructure 210, and then at step 570 the records may also be rendered at, and may be stored by, the core banking system 110.

In certain embodiments of the present invention, there may be a blockchain configured banking core (BCBC) hosted on a server, a blockchain configured component communicatively coupled to the BCBC and configured to be accessible by a number of external computing systems associated with a number of entities, such that the blockchain configured component permits interaction amongst the number of external computing systems in a manner bypassing the BCBC, and such that the blockchain configured component further permits transfer of a plurality of data records to the BCBC over an independent verification network, for storage on the BCBC. The independent verification network may be implemented, for example, as a set of nodes which independently check integrity of data such as business data, and may be employed on any general-purpose network of computers with an appropriate security configuration. In these embodiments, there may further be a number of blockchain configured federation proxies, including a processing device configured to manage and communicate the plurality of data records in a blockchain configured distributed framework, and further including a blockchain validation device configured to receive digital inputs from the BCBC and based thereon to identify access rules and execute blockchain validation mechanisms, wherein the number of blockchain configured federation proxies are communicatively coupled to the BCBC and to the number of external computing systems, configured to retrieve the number of data records from the BCBC and to selectively distribute data records from amongst the number of data records to the number of external computing systems and selectively display the data records to the number of entities based on requests of the number of entities and based on authentication of the number of entities by the blockchain validation device using the access rules and the blockchain validation mechanisms, such that the number of blockchain configured federation proxies selectively identify a source data record from amongst the number of data records, and selectively identify, as an intended recipient of the source data record, a target computing system from amongst the number of external computing systems. The federation proxies may advantageously add an additional security layer, and the blockchain configuration advantageously approves reliability.

In further embodiments, the selective identification of at least one of the source data record and the target computing system may be based on several of (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

In alternate embodiments, the selective identification of at least one of the source data record and the target computing system may be based on (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record. The number of entities may subscribe with the BCBC to create, store, edit, manage or control the number of data records. The number of data records may be stored on a number of subsystems, and the number of subsystems may include an independently verifiable network and a computer software component configured to serve as a data record provider. The number of data records may be stored in a hardware repository associated or coupled with the BCBC.

The plurality of blockchain configured federation proxies may be configured to create a virtualization layer providing to the number of entities distributed virtual access to the number of data records. Other configurations that provide for distributed access to the data records may alternatively be employed.

The blockchain validation device may include an authentication computer software component configured to execute the blockchain validation mechanism, and the blockchain validation mechanism may include processing information received from bank account owners associated with at least one of the number of entities to verify an identity of the at least one of the number of entities.

The selective identification of the at least one of the source data record and the target computing system may be performed upon receipt of a request from the owner of the source data record and the target computing system may be permitted access to the source data record only during the indicated timeframe.

The identity of the entity associated with the target computing system may be provided to the owner of the source data record, and the owner of the source data record may be permitted to modify each of the items (a)-(e) above based on review of the identity.

An identity of the entity associated with the target computing system may be provided to the owner of the source data record, and the owner of the source data record may be permitted to terminate or limit access to the source data record by the target computing system based on review of the identity.

The blockchain validation system may further include a digitized policy controller that is configured to generate an output based on rules and preferences created by the number of entities, and to transmit the output to the blockchain configured component, and the blockchain configured component is configured to authorize or control access to the number of data records by the number of entities based on the output. In a further embodiment, the blockchain validation system of claim further includes a digitized banking transaction registry configured to generate the number of data records and to generate digitized reports based on the number of data records upon a request from the number of entities, and the digitized reports may be selectively transmitted to the number of entities based on an approval decision of the digitized policy controller.

The blockchain configured component may be configured to provide an interactive communication module interface to the plurality of entities facilitating the plurality of entities to communicate with each other and with the BCBC through an active communication network. In a further embodiment, the active communication network may further facilitate communication with the blockchain configured federation proxies.

The blockchain configured component may further include a banking core software module facilitating the number of entities to perform banking core interaction through the number of blockchain configured federation proxies.

The blockchain configured component may include a single computerized sign-on module for a number of network electronic applications, wherein the blockchain configured component is configured to control access by the number of entities to the number of network electronic applications via the single computerized sign-on module, and wherein the single computerized sign in module permits access by the number of entities to the number of data records by signing in to at least one of the number of network electronic applications.

The plurality of data records may be stored in a payments and transfers registry that is standardized and defined in accordance with a template. The payments and transfers registry may be accessible by the BCBC and by the number of blockchain configured social federation proxies.

The number of data records may include interest calculations on loans or deposits stored in a manner that is standardized and defined in accordance with a template. The data records including interest calculations on loans or deposits may be stored in the BCBC and periodically updated. In a further embodiment, a first cross-reference to the data records including interest calculations on loans or deposits may be maintained by the number of blockchain configured federation proxies and a second cross-reference data records including interest calculations on loans or deposits may be maintained by the BCBC. Access to the first cross-reference and the second cross-reference by the number of entities may be redirected to an external storage location for viewing, accessing, and managing the number of data records including interest calculations on loans or deposits.

In yet a further embodiment of the present invention, there is a method for blockchain validation, including permitting interaction amongst a number of external computing systems associated with a number of entities in a manner bypassing a blockchain configured banking core (BCBC) hosted on a server, through a blockchain configured component accessible by the external computing systems; permitting transfer of a number of data records to the BCBC over an independent verification network, for storage on the BCBC, through the blockchain configured component; managing and communicating the number of data records in a blockchain configured distributed framework, through a number of blockchain configured federation proxies; receiving, at the number of blockchain configured federation proxies, digital inputs from the BCBC, and based thereon identifying access rules and executing blockchain validation mechanisms; retrieving from the BCBC, at the number of blockchain configured federation proxies, the number of data records; and selectively distributing to the number of external computing systems and displaying to the associated number of entities, using the number of blockchain configured federation proxies, data records from amongst the number of data records, based on requests of the number of entities and based on authentication of the number of entities using the access rules and the blockchain validation mechanism, such that the number of blockchain configured federation proxies selectively identify a source data record from amongst the plurality of data records, and selectively identify, as an intended recipient of the source data record, a target computing system from amongst the number of external computing systems.

The selective identification of at least one of the source data record and the target computing system may be based on several of (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

Alternately, the selective identification of at least one of the source data record and the target computing system may be based on (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween. Certain embodiments of the present disclosure may include none, some, or all of the above technical advantages. One or more other technical advantages may be readily apparent to one skilled in the art in view of the figures, descriptions, and claims of the present disclosure. For example, technical advantages of one or more embodiments may additionally include (1) efficiently processing financial transactions associated with various blockchain systems, (2) processing financial transactions using an entity access control module, such that through a single access control module, an entity may access different financial record systems and allowing for a more streamlined and efficient client experience, and (3) allowing an entity to verify financial transactions anonymously using the client access module.

What is claimed is:

1. A blockchain validation system comprising:
   a blockchain configured banking core (BCBC) hosted on a server;
   a blockchain configured software component communicatively coupled to the BCBC and configured to be accessible by a plurality of external computing systems associated with a plurality of entities, wherein the blockchain configured software component permits interaction amongst the plurality of external computing systems in a manner bypassing the BCBC, and wherein the blockchain configured software component further permits transfer of a plurality of data records to the BCBC over an independent verification network, for storage on the BCBC; and
   a plurality of blockchain configured federation proxies, comprising a processing device that comprises a hardware processor configured to manage and communicate the plurality of data records in a blockchain configured distributed framework, and further comprising a blockchain validation device that comprises a hardware processor configured to receive digital inputs from the BCBC and based thereon to identify access rules and execute a blockchain validation mechanism, wherein the plurality of blockchain configured federation proxies are communicatively coupled to the BCBC and to the plurality of external computing systems, configured to retrieve the plurality of data records from the BCBC and to selectively distribute data records from amongst the plurality of data records to the plurality of external computing systems and selectively display the data records to the plurality of entities based on requests of the plurality of entities and based on authentication of the plurality of entities by the blockchain validation device using the access rules and the blockchain validation mechanism, wherein the blockchain validation mechanism comprises processing information received from bank account owners associated with at least one of the plurality of entities to verify an identity of the at least one of the plurality of entities, and wherein the plurality of blockchain configured federation proxies selectively identify a source data record from amongst the plurality of data records, and selectively identify, as an intended recipient of the source data record, a target computing system from amongst the plurality of external computing systems.

2. The blockchain validation system of claim 1, wherein the selective identification of at least one of the source data record and the target computing system is based on at least two of (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

3. The blockchain validation system of claim 1, wherein the selective identification of at least one of the source data record and the target computing system is based on (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

4. The blockchain validation system of claim 3, wherein the plurality of entities subscribe with the BCBC to create, store, edit, manage or control the plurality of data records.

5. The blockchain validation system of claim 3, wherein the plurality of data records are stored on a plurality of subsystems, and wherein each of the plurality of subsystems comprises an independently verifiable network and a computer software component configured to serve as a data record provider.

6. The blockchain validation system of claim 3, wherein the plurality of data records are stored in a hardware repository associated or coupled with the BCBC.

7. The blockchain validation system of claim 3, wherein the plurality of blockchain configured federation proxies are configured to create a virtualization layer providing to the plurality of entities distributed virtual access to the plurality of data records.

8. The blockchain validation system of claim 3, wherein the blockchain validation device comprises an authentication computer software component configured to execute the blockchain validation mechanism.

9. The blockchain validation system of claim 3, wherein the selective identification of the at least one of the source data record and the target computing system is performed upon receipt of a request from the owner of the source data record and the target computing system is permitted access to the source data record only during the indicated timeframe.

10. The blockchain validation system of claim 3, wherein an identity of an entity associated with the target computing system is provided to the owner of the source data record, and wherein the owner of the source data record is permitted to modify each of (a)-(e) based on review of the identity.

11. The blockchain validation system of claim 3, wherein an identity of an entity associated with the target computing system is provided to the owner of the source data record, and wherein the owner of the source data record is permitted terminate or limit access to the source data record by the target computing system based on review of the identity.

12. The blockchain validation system of claim 3, further comprising a digitized policy controller that is configured to generate an output based on rules and preferences created by the plurality of entities, and to transmit the output to the blockchain configured software component, wherein the blockchain configured software component is configured to authorize or control access to the plurality of data records by the plurality of entities based on the output.

13. The blockchain validation system of claim 12, further comprising a digitized banking transaction registry configured to generate the plurality of data records and to generate digitized reports based on the plurality of data records upon a request from the plurality of entities, wherein the digitized reports are selectively transmitted to the plurality of entities based on an approval decision of the digitized policy controller.

14. The blockchain validation system of claim 3, wherein the blockchain configured software component is configured to provide an interactive communication module interface to the plurality of entities facilitating the plurality of entities to communicate with each other and with the BCBC through an active communication network.

15. The blockchain validation of claim 14, wherein the active communication network further facilitates communication with the blockchain configured federation proxies.

16. The blockchain validation system of claim 3, wherein the blockchain configured software component further comprises a banking core software module facilitating the plurality of entities to perform banking core interaction through the plurality of blockchain configured federation proxies.

17. The blockchain validation system of claim 3, wherein the blockchain configured software component comprises a single computerized sign-on module for a plurality of network electronic applications, wherein the blockchain configured software component is configured to control access by the plurality of entities to the plurality of network electronic applications via the single computerized sign-on module, and wherein the single computerized sign in module permits access by the plurality of entities to the plurality of data records by signing in to at least one of the plurality of network electronic applications.

18. The blockchain validation system of claim 3, wherein the plurality of data records are stored in a payments and transfers registry that is standardized and defined in accordance with a template, and wherein the payments and transfers registry is accessible by the BCBC and by the plurality of blockchain configured social federation proxies.

19. The blockchain validation system of claim 3, wherein the plurality of data records comprise interest calculations on loans or deposits stored in a manner that is standardized and defined in accordance with a template, and wherein the data records comprising interest calculations on loans or deposits are stored in the BCBC and periodically updated.

20. The blockchain validation system of claim 19, wherein a first cross-reference to the data records comprising interest calculations on loans or deposits is maintained by the plurality of blockchain configured federation proxies and a second cross-reference data records comprising interest calculations on loans or deposits is maintained by the BCBC, and wherein access to the first cross-reference and the second cross-reference by the plurality of entities is redirected to an external storage location for viewing, accessing, and managing the plurality of data records comprising interest calculations on loans or deposits.

21. A method for blockchain validation, comprising:
  permitting interaction amongst a plurality of external computing systems associated with a plurality of entities in a manner bypassing a blockchain configured banking core (BCBC) hosted on a server, through a blockchain configured component accessible by the external computing systems;
  permitting transfer of a plurality of data records to the BCBC over an independent verification network, for storage on the BCBC, through the blockchain configured component;
  managing and communicating the plurality of data records in a blockchain configured distributed framework, through a plurality of blockchain configured federation proxies;
  receiving, at the plurality of blockchain configured federation proxies, digital inputs from the BCBC, and based thereon identifying access rules and executing a blockchain validation mechanism;
  retrieving from the BCBC, at the plurality of blockchain configured federation proxies, the plurality of data records; and selectively distributing to the plurality of external computing systems and displaying to the associated plurality of entities, using the plurality of blockchain configured federation proxies, data records from amongst the plurality of data records, based on requests of the plurality of entities and based on authentication of the plurality of entities using the access rules and the blockchain validation mechanism, wherein the blockchain validation mechanism comprises processing information received from bank account owners associated with at least one of the plurality of entities to verify an identity of the at least one of the plurality of entities, and wherein the plurality of blockchain configured federation proxies selectively identify a source data record from amongst the plurality of data records, and selectively identify, as an intended recipient of the source data record, a target computing system from amongst the plurality of external computing systems.

22. The method for blockchain validation of claim 21, wherein the selective identification of at least one of the source data record and the target computing system is based on at least two of (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

23. The method for blockchain validation of claim 21, wherein the selective identification of at least one of the source data record and the target computing system is based on (a) a permission from an owner of the source data record, (b) an indication of an extent of data access, (c) a characteristic of the target computing system, (d) an indicated purpose of access to the source data record by the target computing system, and (e) an indicated timeframe for allowing access to the source data record.

* * * * *